P. C. DOLLIVER.
TIDE POWER APPARATUS.
APPLICATION FILED APR. 17, 1920.
1,364,619.
Patented Jan. 4, 1921.
2 SHEETS—SHEET 1.
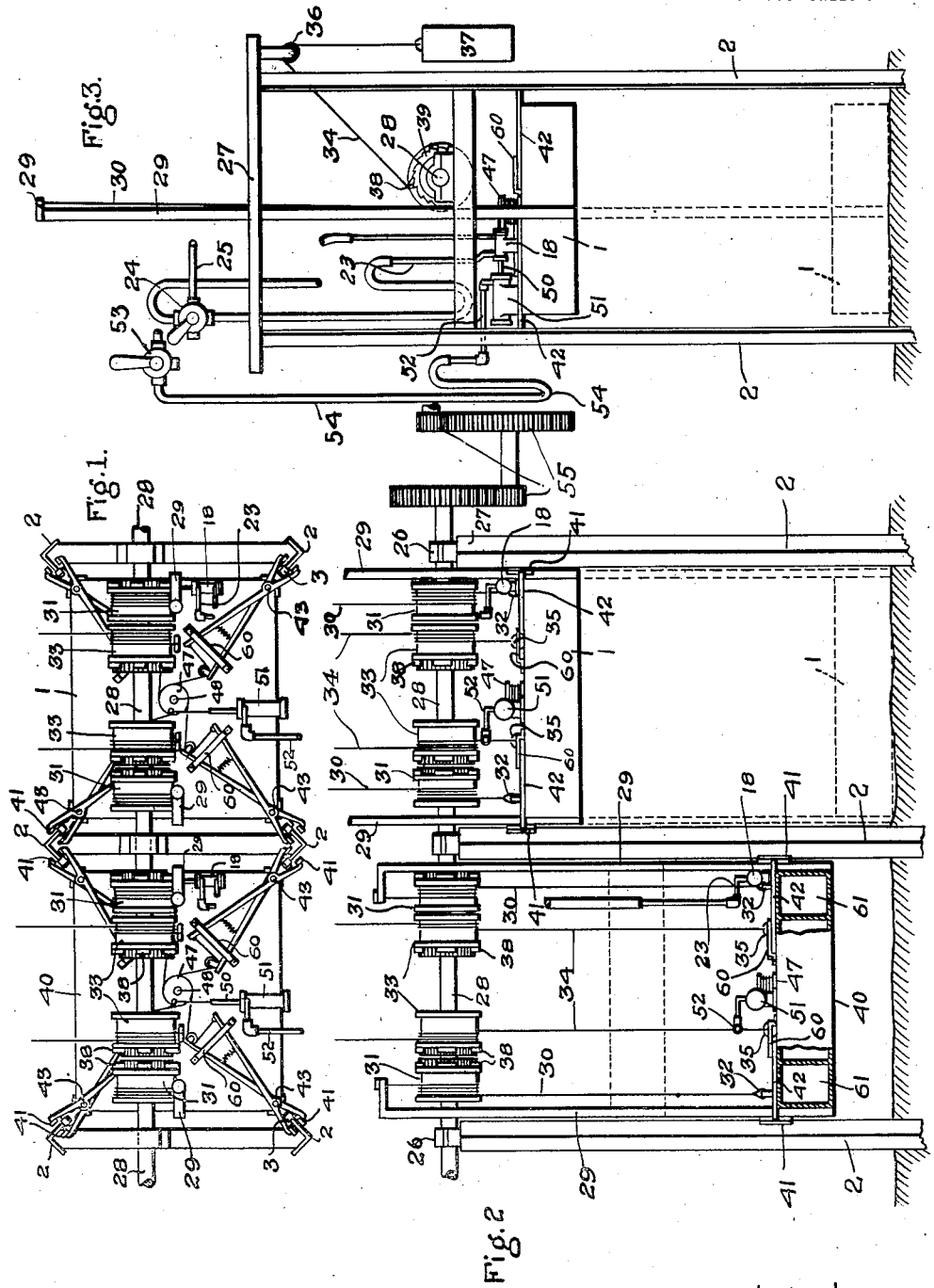
Inventor
Pillsbury C. Dolliver.
by Heard Smith & Tennant.
Attys P. C. DOLLIVER.
TIDE POWER APPARATUS.
APPLICATION FILED APR. 17, 1920.
1,364,619.
Patented Jan. 4, 1921.
2 SHEETS—SHEET 2.
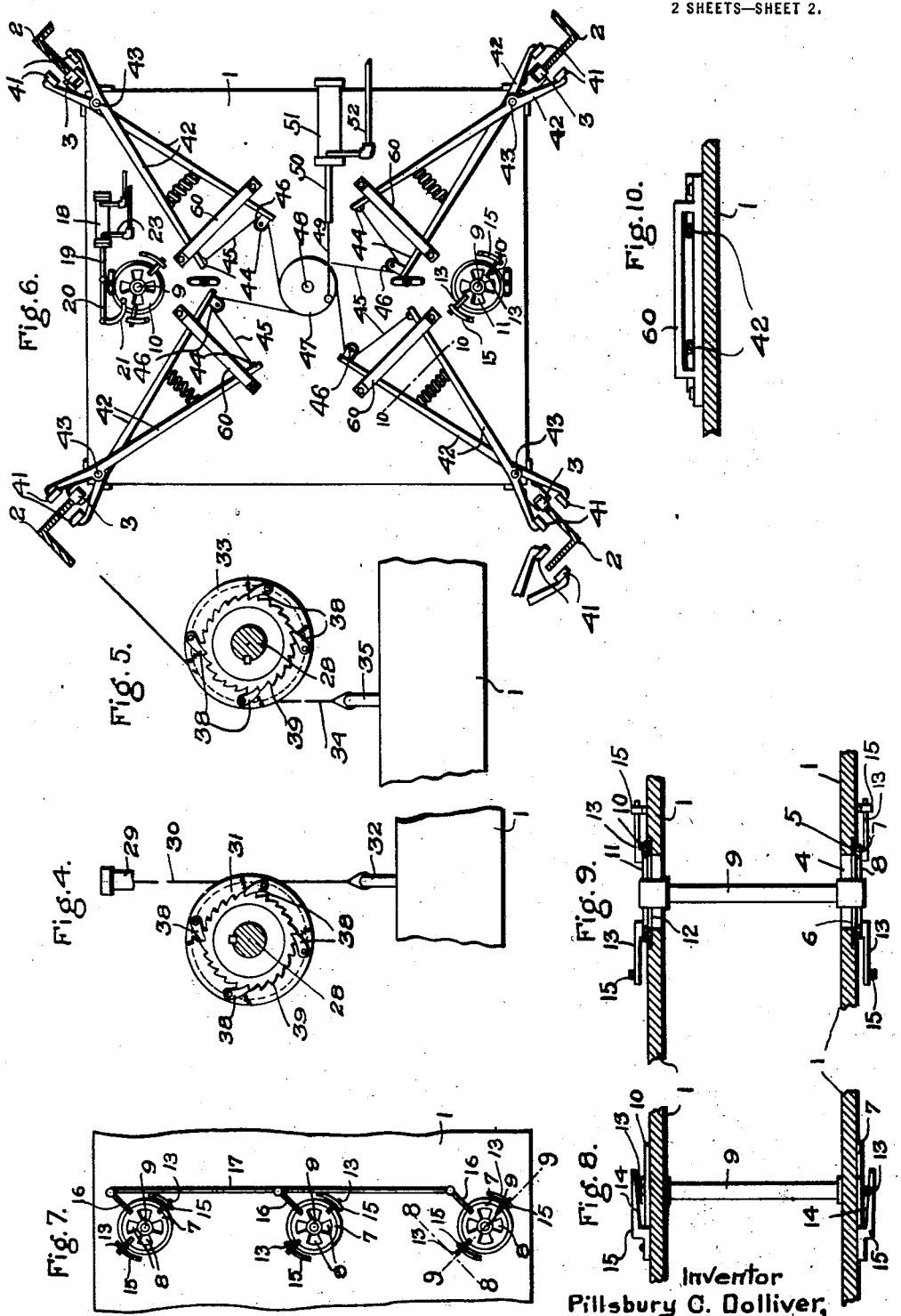
Inventor
Pillsbury C. Dolliver,
by Heard Smith & Tennant
Atty's.

UNITED STATES PATENT OFFICE.

PILLSBURY C. DOLLIVER, OF MEDFORD, MASSACHUSETTS.

TIDE-POWER APPARATUS.

1,364,619.  Specification of Letters Patent.  Patented Jan. 4, 1921.

Application filed April 17, 1920. Serial No. 374,554.

*To all whom it may concern:*

Be it known that I, PILLSBURY C. DOLLIVER, a citizen of the United States, residing at Medford, county of Middlesex, State of Massachusetts, have invented an Improvement in Tide-Power Apparatus, of which the following description, in connection with the accompanying drawing, is a specification, like characters on the drawing representing like parts.

This invention relates to an apparatus for obtaining power from the rise and fall of the tide and it has particular relation to that class of tide power apparatus which includes a weight or float that rises and falls with the tide, and means whereby such rising and falling movement of the float may be utilized to operate shafting and drive machinery, or furnish power for any desired purpose.

One of the principal objects of the invention is to provide a noved tide power apparatus which is constructed to furnish power continuously.

It has heretofore been proposed to provide a tide power apparatus which includes a float or weight that is raised by the incoming tide and which descends with the outgoing tide, and the rising and falling of which furnishes power, but such apparatus is defective unless some means are provided for furnishing power at high tide or at low tide because at these periods the float will be practically stationary and thus no power will be furnished.

As stated above, the principal object of my invention is to provide a tide power apparatus which is constructed so as to furnish power at the times when the tide is turning so that power may be furnished continuously regardless of the condition of the tide. I accomplish this object by providing a main weight or float which rises and falls with the tide and which furnishes power while the tide is rising and again while it is falling and by also providing an auxiliary float or weight which is arranged to become operative for furnishing power at the time when the tide is turning.

The weights or floats I propose to use are in the form of hollow tanks which have valves or openings so that they can be filled with air and thus become floats for use during the rising tide, and may be filled with water, thus becoming weights to be used with the falling tide.

The auxiliary float or weight will have a travel somewhat less than that of the main float, and when the tide has risen nearly to its high mark and the main tank has consequently been lifted substantially to the upper limit of its movement, the auxiliary float which has been held from movement at its low point will come into operation to furnish the power while the tide is changing and while the main tank is at its high position. When the tide begins to go out, the main tank will be filled with water and will be held from downward movement until the water level has fallen below it, at which time it will be released so that it will operate as a weight which will furnish power as it descends. When the main tank thus begins to operate to furnish power, the auxiliary tank will be filled with water and then will be held in its high position until the tide has reached its low point. The auxiliary tank will then be allowed to descend and thus furnish power while the tide is turning, during which time the water will be released from the main tank and it will be filled with air, thus becoming a float to furnish power on the incoming tide.

In order to give an understanding of my invention, I have illustrated in the drawing a selected embodiment thereof which will now be described, after which the novel features will be pointed out in the appended claims.

In the drawings, Figure 1 is a top plan view of a tide power apparatus embodying my invention;

Fig. 2 is a side view;

Fig. 3 is an end view;

Figs. 4 and 5 show connections which may be employed for translating the rising and falling movement of the tanks or floats to a rotary motion;

Fig. 6 is a top plan view of one of the floats;

Fig. 7 is an underside plan view showing valves which may be employed for letting water into and out of the tank or float;

Fig. 8 is an enlarged section on the line 8—8, Fig. 7;

Fig. 9 is an enlarged section on the line 9—9, Fig. 7;

Fig. 10 is an enlarged section on the line 10—10, Fig. 6.

In Figs. 1, 2 and 3, 1 indicates the main float or weight which is herein shown in the form of a tank arranged to be filled with either water or air as conditions require. This tank is adapted for rising or falling movement and may be guided in its movement in any suitable way. I have herein shown a framework comprising four vertical posts 2 within which the tank is received and which form guides for guiding rollers 3 carried by the tank.

The posts 2 may have any suitable construction. Those herein shown are in the form of angle-iron posts arranged so that the rolls 3 which extend radially from the tanks will roll against the edges of one flange of the angle-iron. The reason for this particular arrangement of angle-iron posts will be presently described. The posts 2 are connected at their upper ends by suitable framework 27.

Situated above the tank and journaled in suitable bearings 26 carried by the framework 27 is a power shaft 28. The float 1 has connected to its opposite ends two uprights 29, and each upright has fastened to its upper end a flexible connection 30 which passes several times around a drum 31 loose on the shaft 28, the other end of the flexible connection being secured to the tank or float in some suitable way, as shown at 32. The shaft 28 also has loosely mounted thereon one or more additional drums 33, each of which has a flexible connection 34 wound several times thereabout, one end of each flexible connection 34 being connected to the tank, as shown at 35, and the other end extending over a direction pulley 36 and having a counterweight 37 secured thereto. Each counterweight will preferably be large enough to counterbalance the weight of the flexible connection 34.

The drums 31 and 33 are connected to the shaft 28 by means of a pawl-and-ratchet device, each drum being shown as having one or more spring-pressed pawls 38 thereon, the pawls for each drum coöperating with a ratchet 39 which is fast on the shaft 28. With this construction it will be apparent that as the float or weight 1 rises, the drums 31 will be positively turned by the action of the flexible connections 30, and the pawls 38 associated with the drums 31 are so arranged that the turning movement of the drums due to the rising of the member 1 will drive the shaft 28 forward. When the member 1 falls with the tide, the pawls of the drums 31 will simply click over their ratchets 39. The rising and falling movement of the member 1 will also rotate the drums 33 by means of the flexible connections 34, and these flexible connections are so wound on the drums 33 that the rotation of the drums 33 due to the falling of the member 1 will be in the same direction as the rotation of the drums 31 due to the rising of the member 1.

The pawls 38 for the drums 33 are also arranged so that when the drums 33 are rotated by the falling member 1, said pawls will drive the shaft 28 positively forwardly, and with this arrangement, therefore, the shaft 28 will be always rotating in the same direction.

In order to give the tank a maximum lifting power when it is rising and a maximum pulling power when it is falling, I provide for filling the tank with air when it is at its low point so that it will become a float as it rises and then filling it with water when it is at the high point so that it becomes a heavy weight as it descends. This is accomplished by making the tank with water valves preferably situated in its bottom for admitting water to or allowing it to drain from the tank and also making the tank with air valves in its top for allowing the air to escape from the tank as the latter is filled and to enter the tank as the latter is emptied of water.

The valves may have any suitable construction without departing from my invention. I have shown herein rotary disk valves, but I wish it distinctly understood that this particular type of valve is not essential to the invention.

The valves are shown best in Figs. 7 and 9. The tank 1 is shown as provided with one or more openings 4 in its bottom, each of which has associated therewith a valve-plate 5 that is formed with a plurality of apertures 6. Coöperating with this valve plate 5 is a rotary valve 7 which is also provided with apertures 8. When the valve is in one position the apertures 6 and 8 are in alinement and the valve is open, but by giving the valve a partial turn, the apertures 8 will be carried out of alinement with the apertures 6, thus closing the valve. The valve 7 is mounted on a post or shaft 9 which extends through the tank and has at its upper end another valve disk 10 situated on top of the tank. This valve disk 10 is similar to the valve disk 7. Coöperating with the valve disk 10 is a valve plate 12 also having apertures therein, said plate being stationarily carried by the top of the tank 1. The valve 11 is in the nature of an air valve and it is connected with the valve 7 so that the two operate in unison. When, therefore, the valve 7 is open either for the purpose of letting water into the tank or for allowing water to drain out of the tank, the air valve will also be opened to let the air out of the tank or admit the air thereto.

In order to produce a tight fit between the valve and its valve seat or plate when the valve is closed, each valve is provided with arms 13 which are adapted to pass under the inclined faces 14 of hold-down arms 15 when the valve is closed, as seen in Fig. 8. The engagement of the arms 13 with the faces 14 serves to force the valves tightly to their seats when they are closed, thus preventing any possibility of leakage. Any number of water valves may be employed in the bottom of the tank and of air valves in the top of the tank. In Fig. 7 which shows a portion of the bottom of the tank, I have shown three water valves, all of which are connected so as to operate in unison. This is accomplished by providing each valve 7 with an arm 16 and connecting all the arms with a connecting member 17.

I have shown in Fig. 6 two air valves 10 in the top of the tank, each being connected through a shaft 9 with one of the water valves in the bottom of the tank. In this way, the valves are all connected together and may all be operated in unison. Any suitable way of operating the valves may be employed without departing from the invention. I prefer, however, to actuate the valves by means of a piston which operates in a cylinder and which may be driven by any suitable motive fluid, such, for instance, as compressed air. In Fig. 6 I have shown a power cylinder 18 secured to the top of the tank 1 and having a piston therein, the piston rod 19 of which is connected by a connecting rod 20 to an arm 21 fast to one of the air valves 10. The cylinder has two pipes 23 connected thereto through which compressed air or other motive fluid may be admitted for the purpose of moving the piston in either direction and thereby opening or closing the valves. These pipes 23 lead to a manually-controlled four-way valve 24, the latter being connected to a suitable source of compressed air supply through a supply pipe 25. When the valve 24 is turned into one position motive fluid will be admitted to one end of the cylinder 18 and exhausted from the other end thereby opening the valves 10, and when said valve 24 is turned into another position, the motive fluid will be exhausted from the first-named end of the cylinder and admitted to the opposite end, thus closing the valves 10.

Since all the valves are connected together, the cylinder 18 will operate as a motor for simultaneously opening and closing all the valves.

In using the device, assuming that the tide is at low ebb, the valves of the tank will be opened thereby allowing the water to drain out therefrom and permitting said tank to be filled with air through the air valves. When the water has entirely drained out of the tank, then the valves are closed. The opening and closing of the valves are simultaneously accomplished by means of the operation of the cylinder 18, as above described. When the member 1 is filled with air it becomes a float and will be buoyed up by the rising tide, and as it rises it will operate through the connections 30 and drums 31 to rotate the shaft 28. Just before high tide is reached the cylinder 18 is operated to open the valves, thus allowing the water to enter the tank and the air to escape therefrom. At this time the tank will be held from vertical movement by suitable mechanism hereinafter described, and it will remain in this position until the tide begins to fall again, at which time the filled tank will descend with the falling tide. During the descent of the tank the drums 31 are rotated in the opposite direction from what they were when the tank was rising, and the pawls 38 for such drums will merely click over their ratchets 39. The downward movement of the member 9, which is now a weight, operates through the connections 34 to rotate the drums 33, and said connections 34 are so wound on the drums 33 that they rotate in a direction opposite to that in which the drums 31 rotate. Hence during the descending movement of the member 1 the drums 33 are rotating in the same direction as the drums 31 were when the member 1 was rising. Hence during the falling movement of the member 1, the drums 33 are active in rotating the shaft 28.

While a single tank, such as above described, will furnish power during the rising of the tide and during the falling of the tide, yet at ebb tide and flood tide it will be practically stationary and will furnish no power. To provide for development of power at these critical points, I employ a second tank 40 which is similar to the tank 1 and is similarly guided between guiding posts 2 of the framework. It is also similarly connected to drums 31 and 33 by flexible connections 30 and 34 and the drums 31 and 33 for the auxiliary tank 40 are mounted on the shaft 28 and are connected thereto by pawls 38.

The manner in which the auxiliary tank 40 operates to furnish power while the tank 1 is stationary at high tide or at low tide is as follows:

Assuming that it is ebb tide and that the main tank 1 is at the low point indicated at dotted lines, Fig. 2, the valves may be opened to allow any water in said tank to escape and the tank will become filled with air, after which the valves will be shut. At this time the auxiliary float or tank 40 will be in substantially the position shown in full lines Fig. 2, and the valves therein will be opened to permit any water to drain out therefrom, after which they will be closed. The auxiliary float 40 is then locked in this position by means presently to be described, so that it cannot rise. As the tide rises, the member 1 which is now a float will be buoyed up thereby rotating the shaft 28, and this action will continue until nearly high tide. Just before high tide the valves in the main tank member 1 are opened to allow water to enter the same. At this time the member 1 will cease furnishing power and is locked against vertical movement. During the time when the tank 1 is inactive for furnishing power, the auxiliary tank 40 is employed for this purpose, and this is accomplished by releasing the auxiliary tank, now submerged under several feet of water, and allowing said tank to rise to the surface of the water. This rising movement of the auxiliary tank 40 will furnish the power to rotate the shaft 28 while the tide is turning at flood tide and until the tide subsides below the main tank 1, at which time said tank is released and will then act as a weight for rotating the shaft 28 as it descends with the falling tide. By this time the auxiliary tank 40 is in substantially the dotted line position, Fig. 2, and just before the auxiliary tank is carried out of the water the valves therein are opened so as to allow it to become filled with water, at which time it is locked in such position and held while the tank 1 is descending and furnishing power. When the tank 1 reaches the low point shown in dotted lines, and thus ceases to become a power-producing agency, the filled auxiliary tank 40 is released and it operates then to furnish power while the main tank 1 is being emptied of water and filled with air and is waiting to be lifted again by the rising tide.

It will thus be seen that the auxiliary tank 40 has a less amplitude of movement than the main tank 1, but that it comes into play to furnish power during the interim when the tank 1 would be inoperative for this purpose. Therefore, power will be continuously furnished to the shaft 28.

I have above referred to means for locking the main tank at its high point and its low point while the auxiliary tank is furnishing power, and for locking the auxiliary tank at its high point or its low point while the main tank is furnishing power. Any suitable device for thus holding the tank stationary may be employed without departing from my invention. I have, however, shown herein a locking device in the form of clamping members carried by each tank and which are constructed to be clamped firmly to the posts 2. In Fig. 6, for instance, the tank 1 is shown with four pairs of clamping members, one for each post, the clamping members of each pair being shown at 41. These clamping members are carried by arms 42 which cross each other scissors-fashion and are pivoted together and to the tank at 43. When the inner ends 44 of each pair of levers 42 are drawn together the clamping members 41 will be carried firmly against and clamped onto the sides of one of the angles of the post 2, and the friction produced by all of the clamps on each tank will be sufficient to hold the tank from vertical movement. The inner ends of the arms 42 operate in a guiding member 60 secured to the top of the tank. For operating the clamping device I propose to employ a mechanism which can be operated from the framework 27 regardless of the vertical position of the tank. The inner end 44 of one arm 42 of each pair of clamps has a flexible connection 45 connected thereto which passes around a roll 46 carried by the inner end 44 of the other arm 42. Each flexible connection 45 is connected to a drum 47 rotatably mounted at 48 on the tank. This drum is connected by a connecting rod 49 to the piston rod 50 of a piston operating in a cylinder 51. The cylinder has a pipe 52 connected thereto leading to a three-way valve 53 by which the supply of motive fluid can be admitted to the cylinder. When the valve 53 is opened, the compressed air or other motive fluid admitted to the cylinder will operate the piston and rotate the drum 47, thereby winding up the flexible connections 45 thereon. This operates to close the clamps onto the posts thereby locking the tank from vertical movement. The pipe 52 has a flexible portion 54 therein to provide for the rising and falling movement of the tank, and with this construction, it is possible to operate the clamps regardless of the position of the tank and regardless of whether the tank is under water or above water. When the motive fluid is exhausted from the cylinder, the clamping pressure is relieved and the tank will be allowed to rise or fall as the case may be.

The advantage of using angle iron for the posts is that when the posts 2 between the two tanks 1 and 2 are set as indicated in Figs. 1 and 6, one of the tanks will operate on one leg of the post while the other tank will operate on the other leg of the post. With this arrangement, the construction of the framework is simplified.

Since each tank itself weighs something, it will follow that when the tank acts as a float, its lifting power will be less than its power as a weight when filled with water by an amount equal to the weight of the tank itself. To counteract this I propose to make each tank with one or more air chambers 61 which will contain air permanently and which is sufficient to give a buoyant effect substantially equal to the weight of the tank. When, therefore, the tank is being used as a float it will have a buoyant effect of the air in the main chamber of the tank plus that of the air in the chamber 61, while when it acts as a weight it will have a power equal to the weight of the tank plus the weight of the water in the main chamber only. By properly proportioning these auxiliary chambers 61, each tank will produce the same power both in rising and falling.

The shaft 28 will, of course, rotate relatively slowly, and it will be necessary to interpose a train of gearing indicated at 55 between the shaft and the mechanism to be operated in order to increase the speed. The power which is developed in the shaft 28 will depend upon the size of the tanks and the number which are used. I have shown in the drawings a single main tank and a single auxiliary tank, but I wish it understood that any number of tanks can be employed simply by extending the shaft 28. The amount of power which may be developed, therefore, is limited only by the length to which it is practical to carry the shaft 28 and the number of tanks which it is practical to connect to the shaft.

My apparatus is simple and as it is controlled entirely by the valves 53 and 24 that are situated where they can be easily manipulated by a person on the framework 27, it is possible to develop an enormous amount of power with the use of practically no labor.

While I have shown in the drawings a single shaft 28, yet the number of shafts which are associated with each set of tanks is immaterial, and if the tanks are of relatively large size it may be desirable to employ two or more shafts so that the weight of the tanks will be distributed on a plurality of shafts. I also wish to state that various other changes in constructional features may be made without departing in any way from the invention.

It is the intention that the auxiliary tank will be of the same size as the main tank and therefore the power which is developed by the auxiliary tank will be equal to that which is developed by the main tank. This auxiliary tank therefore, constitutes a source of reserved power which is brought into use at the time when the main tank is incapable of developing power. With my device, therefore, there will be continuity in the production of power and the same amount of power will be developed at all times.

Another feature of my invention is that both the main tank and the auxiliary tank are subjected to the direct action of the tides.

I claim:

1. In a tide power apparatus, the combination with a main tank constructed to be filled with air to act as a float during the rising tide and to be filled with water to act as a weight during the falling tide, of a power shaft, means to translate the rising and falling movement of the tank into rotative movement of the power shaft, an auxiliary tank also constructed to be filled with either air or water thereby to act as a weight or a float, means to lock the auxiliary tank from movement while the main tank is rotating the shaft, and means to cause said auxiliary tank to maintain the shaft in rotation when the main tank is inactive at the turn of the tide.

2. In a tide power apparatus, the combination with a main tank constructed to be filled with air to act as a float during the rising tide and to be filled with water to act as a weight during the falling tide, of a power shaft, means to translate the rising and falling movement of the tank into rotative movement of said shaft, an auxiliary tank also constructed to be filled with either air or water thereby to act as a float or a weight, means to cause the auxiliary tank to maintain the shaft in rotation when the main tank is inactive at the turn of the tide, and means to hold each tank from vertical movement while the other tank is operating.

3. In a tide power apparatus, the combination with a main tank constructed to be filled with either air or water thereby to act as either a float or a weight, of an auxiliary tank also constructed to be filled with either air or water, a framework in which said tanks are guided in their rising and falling movement, a power shaft, means to translate the rising and falling movement of the main tank into rotative movement of the power shaft, means to hold the auxiliary tank inoperative while the main tank is rotating the power shaft, means for causing the auxiliary tank to continue the rotation of the shaft at the times when the tide is turning and the main tank has no movement and means to hold the main tank inoperative when the auxiliary tank is rotating the shaft.

4. In a tide power apparatus, the combination with a main tank constructed to be filled with either air or water thereby to act as either a float or a weight, of an auxiliary tank also constructed to be filled with either air or water, a framework in which said tanks are guided in their rising and falling movement, a power shaft, means to translate the rising and falling movement of the main tank into rotative movement of the power shaft, means for causing the auxiliary tank to continue the rotation of the shaft at the times when the tide is turning and the main tank has no movement, and means to clamp each tank to the framework during the time that the other tank is developing power.

5. In a tide power apparatus, the combination with a main tank constructed to be filled with air and thereby act as a float during the rising tide and to be filled with water and thereby act as a weight during the falling tide, of an auxiliary tank similarly constructed to act either as a float or as a weight, both the said tanks being subjected to the direct action of the tide, a power shaft, means to translate the rising and falling movement of each tank into rotative movement of the power shaft, means to lock the auxiliary tank from vertical movement while the main tank is rotating the shaft and to release the auxiliary tank, whereby it will operate the power shaft when the main tank is inoperative at flood tide and at ebb tide, and means to lock the main tank from vertical movement while the auxiliary tank is operative.

6. In a tide power apparatus, the combination with two tanks each adapted to be filled with air thereby to act as a float or to be filled with water thereby to act as a weight, both tanks being subjected to the action of the tides, of a power shaft, connections between each tank and said shaft whereby the rising and falling movement of the tanks will rotate said shaft, means to hold one of the tanks from vertical movement while the other tank is actuated by the tide, said first named tank when released furnishing power while the other tank is inactive at the turn of the tide.

7. In a tide power apparatus, the combination with two tanks, both being subjected to the action of the tide, each having a chamber or space adapted to be filled with air thereby to cause the tank to operate as a float or to be filled with water thereby to cause the tank to operate as a weight, each tank having a hermetically sealed air chamber of sufficient size so that the buoyancy of the air therein counteracts the weight of the empty float, of a power shaft, connections between each tank and said shaft, whereby the rising and falling movement of the tanks will rotate said shaft, means to hold one of the tanks from vertical movement while the other tank is actuated by the tide, said first named tank when released furnishing power while the other tank is inactive at the turn of the tide.

In testimony whereof I have signed my name to this specification.

PILLSBURY C. DOLLIVER